(12) United States Patent
Grayson et al.

(10) Patent No.: US 11,832,124 B2
(45) Date of Patent: *Nov. 28, 2023

(54) CONTROLLING PERFORMANCE OF A WIRELESS DEVICE IN A HETEROGENEOUS NETWORK

(71) Applicant: Cisco Technology, Inc., San Jose, CA (US)

(72) Inventors: Mark Grayson, Maidenhead (GB); Santosh Ramrao Patil, Santa Clara, CA (US); Gangadharan Byju Pularikkal, San Jose, CA (US); Kedar K. Gaonkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/451,564

(22) Filed: Oct. 20, 2021

(65) Prior Publication Data

US 2022/0159503 A1 May 19, 2022

Related U.S. Application Data

(63) Continuation of application No. 16/721,618, filed on Dec. 19, 2019, now Pat. No. 11,159,977, which is a (Continued)

(51) Int. Cl.
*H04W 28/02* (2009.01)
*H04W 24/02* (2009.01)
(Continued)

(52) U.S. Cl.
CPC ..... *H04W 28/0268* (2013.01); *H04L 43/0823* (2013.01); *H04L 43/0888* (2013.01);
(Continued)

(58) Field of Classification Search
CPC . H04L 43/0823; H04L 43/0888; H04L 43/16; H04W 24/02; H04W 24/08; H04W 84/042; H04W 28/0268; H04W 88/08
See application file for complete search history.

(56) References Cited

U.S. PATENT DOCUMENTS 9,625,497 B2* 4/2017 Huang .................. H04L 43/067
11,159,977 B2* 10/2021 Grayson ............. H04L 43/0888
(Continued)

*Primary Examiner* — Chi H Pham
*Assistant Examiner* — Weibin Huang
(74) *Attorney, Agent, or Firm* — Patterson + Sheridan, LLP

(57) ABSTRACT

A method of controlling performance of a wireless device is performed by a node that is in electronic communication with a cellular network. The node includes a processor, a non-transitory memory, and a network interface. The method includes receiving a performance value characterizing a performance of a communication channel between a wireless device and a wireless access point. In some implementations, the wireless device and the cellular network are associated with different radio access technologies (RATs). The method includes determining whether the performance value breaches a performance criterion for the wireless device. The method includes adjusting a first amount of data transmitted to the wireless device from a base station of the cellular network and a second amount of data transmitted to the wireless device from the wireless access point. In some implementations, the combined first and second amounts of data satisfy the performance criterion for the wireless device.

17 Claims, 6 Drawing Sheets

Related U.S. Application Data continuation of application No. 15/791,917, filed on Oct. 24, 2017, now Pat. No. 10,517,014.

(51) Int. Cl.
*H04L 43/0888* (2022.01)
*H04L 43/0823* (2022.01)
*H04L 43/16* (2022.01)
*H04W 24/08* (2009.01)
*H04W 88/08* (2009.01)
*H04W 84/04* (2009.01)

(52) U.S. Cl.
CPC ............ *H04L 43/16* (2013.01); *H04W 24/02* (2013.01); *H04W 24/08* (2013.01); *H04W 84/042* (2013.01); *H04W 88/08* (2013.01)

(56) References Cited

U.S. PATENT DOCUMENTS

| | | | |
|---|---|---|---|
| 2011/0122805 A1* | 5/2011 | Abraham | H04W 72/1215 370/312 |
| 2015/0029844 A1* | 1/2015 | Pathmasuntharam | H04W 28/0289 370/230 |
| 2015/0043440 A1* | 2/2015 | Ko | H04W 72/1215 370/329 |
| 2015/0124776 A1* | 5/2015 | Lee | H04W 76/16 370/331 |
| 2016/0262073 A1* | 9/2016 | Muley | H04L 61/5007 |
| 2016/0262162 A1* | 9/2016 | Calin | H04W 74/002 |
| 2017/0063484 A1* | 3/2017 | Naghshvar | H04L 69/22 |
| 2017/0078905 A1* | 3/2017 | Kasslin | H04W 24/10 |

\* cited by examiner

CONTROLLING PERFORMANCE OF A WIRELESS DEVICE IN A HETEROGENEOUS NETWORK

CROSS-REFERENCE TO RELATED APPLICATIONS

This application is a continuation of co-pending U.S. patent application Ser. No. 16/721,618 filed Dec. 19, 2019, which claims benefit to U.S. patent application Ser. No. 15/791,917, filed Oct. 24, 2017, which issued on Dec. 24, 2019 as U.S. Pat. No. 10,517,014. The aforementioned related patent application is herein incorporated by reference in its entirety.

TECHNICAL FIELD

The present disclosure relates generally to heterogeneous networks, and in particular, to controlling performance of a wireless device in a heterogeneous network.

BACKGROUND

Mobile data usage has increased exponentially in recent years. Most mobile devices are capable of accessing different radio access technologies (RATs) in order to send/receive data and perform telecommunication operations. For example, most mobile devices are capable of accessing a base station of a cellular network and a wireless access point that utilizes a different RAT from the base station. While cellular networks provide high data rates, low latency and large geographical coverage, most cellular networks utilize a licensed spectrum. Due to the limited availability of licensed spectrums, many cellular network operators attempt to reduce the usage of their licensed spectrum. However, reducing the usage of the licensed spectrum sometimes negatively impacts the performance of mobile devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
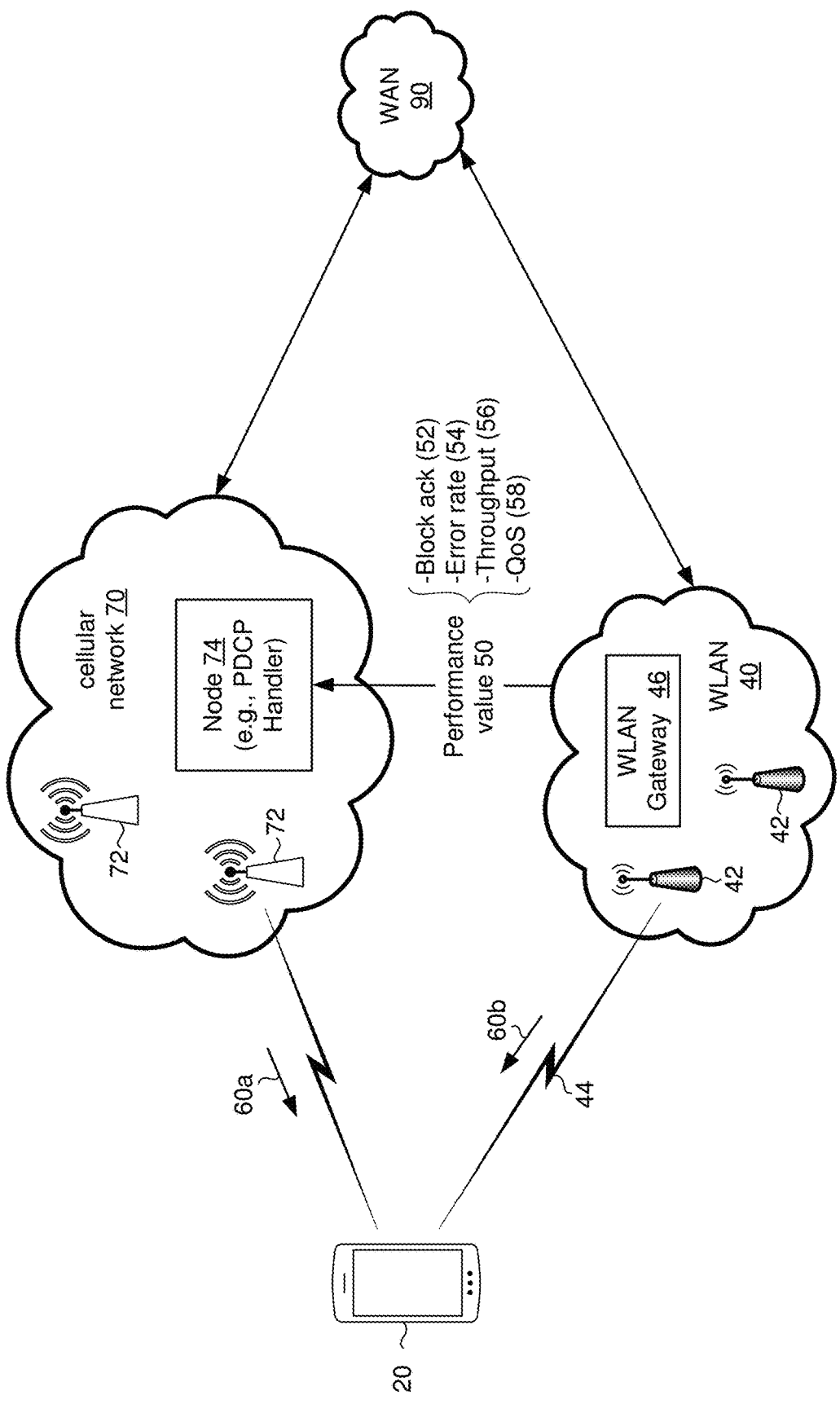
FIG. 1 is a schematic diagram of a heterogeneous network in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable controlling performance of a wireless device in a heterogeneous network. For example, in various implementations, a method of controlling performance of a wireless device is performed by a node that is in electronic communication with a cellular network. In various implementations, the node includes one or more processors, a non-transitory memory, and a network interface. In various implementations, the method includes receiving a performance value characterizing a performance of a communication channel between a wireless device and a wireless access point. In some implementations, the wireless device and the cellular network are associated with different radio access technologies (RATs). In various implementations, the method includes determining whether the performance value breaches a performance criterion for the wireless device. In various implementations, the method includes adjusting a first amount of data transmitted to the wireless device from a base station of the cellular network and a second amount of data transmitted to the wireless device from the wireless access point. In some implementations, the combined first and second amounts of data satisfy the performance criterion for the wireless device.

Example Embodiments

FIG. 1 is a schematic diagram of a heterogeneous network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the heterogeneous network environment 10 includes a wireless device 20 (e.g., a mobile communication device such as a smartphone, tablet computer, or a laptop computer), a wireless local area network (WLAN) 40, a cellular network 70 and a Wide Area Network (WAN) 90 (e.g., a portion of the Internet). In some implementations, the WLAN 40 utilizes a first radio access technology (RAT), and the cellular network 70 utilizes a second RAT that is different from the first RAT. In some implementations, a RAT refers to an underlying physical connection method for a radio based communication network.

In various implementations, the WLAN 40 includes wireless access points (APs) 42 ("AP 42", hereinafter for the sake of brevity), in some implementations, the WLAN 40 provides a communication channel 44 between the wireless device 20 and at least one of the APs 42. The communication channel 44 allows the wireless device 20 to access the WLAN 40 and/or the WAN 90 via the AP 42. For example, in various implementations, the wireless device 20 utilizes the communication channel 44 to send/receive data to/from the WAN 90. In various implementations, the WLAN 40 operates in accordance with IEEE 802.11 standards. In various implementations, the WLAN 40 operates over an unlicensed spectrum. In other words, in some implementations, the WLAN 40 utilizes frequencies that are not licensed (e.g., the 2.4 GHz band and/or the 5 GHz band utilized by 802.11 compliant devices) in order to send/receive data to the wireless device 20. In some implementations, the WLAN 40 includes additional components such as a WLAN gateway 46. In some implementations, the WLAN gateway 46 routes packets from the WLAN 40 to another network (e.g., the WAN 90). While FIG. 1 shows two APs 42, a person of ordinary skill in the art will understand that, in some implementations, the WLAN 40 includes fewer or more APs 42. Moreover, while FIG. 1 shows the APs 42 and the WLAN gateway 46 as being separate, a person of ordinary skill in the art will understand that, in some implementations, one of the APs 42 serves as the WLAN gateway 46.

In various implementations, the cellular network 70 includes base stations 72 and a node 74. In various implementations, a base station 72 provides data and/or telephonic services to various cellular devices such as the wireless device 20. For example, in some implementations, the cellular network 70 provides a communication channel that the wireless device 20 utilizes to access the base station 72. In various implementations, the node 74 determines whether to transmit data to the wireless device 20 from the base station 72 or the AP 42. While in the example of FIG. 1, the node 74 is shown as being a part of the cellular network 70, in some implementations, the node 74 is separate from the cellular network 70. For example, in some implementations, the node 74 is operated by an entity that is different from a cellular network operator that operates the cellular network 70. In the example of FIG. 1, the node 74 is sometimes referred to as a cellular network node. In some implementations, the node 74 performs one or more cellular-related operations in the cellular network 70. In some implementations, the cellular network 70 operates in accordance with 3GPP standards. For example, in some implementations, the cellular network 70 is a fifth-generation (5G) cellular network. While the example of FIG. 1 shows a single node 74, a person of ordinary skill in the art will understand that, in some implementations, the cellular network 70 includes additional nodes.

In various implementations, the cellular network 70 operates over a licensed spectrum. As such, in some implementations, the cellular network 70 has access to a limited number of wireless resources. In order to avoid overusing the limited number of wireless resources (e.g., frequency bands) in the licensed spectrum, in some implementations, the cellular network 70 (e.g., the node 74) transmits/receives data to/from the wireless device 20 over an unlicensed spectrum. For example, in some implementations, the cellular network 70 transmits/receives data to/from the wireless device 20 over the WLAN 40. More generally, in various implementations, the cellular network 70 transmits/receives data to/from the wireless device 20 via a wireless AP that utilizes a different RAT from the cellular network 70. For example, in some implementations, the cellular network 70 transmits/receives data to/from the wireless device 20 via the AP 42. In some implementations, the cellular network 70 communicates with the AP 42 via the WLAN gateway 46. For example, the cellular network 70 sends data to the WLAN gateway 46, the WLAN gateway 46 forwards the data to the AP 42, and the AP 42 forwards the data to the wireless device 20 over the communication channel 44.

In various implementations, the node 74 transmits/receives data to/from the wireless device 20 via the AP 42 based on a performance value characterizing a performance of the communication channel 44 between the wireless device 20 and the AP 42. For example, in some implementations, the node 74 adjusts a first amount of data 60*a* transmitted to the wireless device 20 from the base station 72 and a second amount of data 60*b* transmitted to the wireless device 20 from the AP 42 based on a performance value 50 that characterizes a performance of the communication channel 44. In some implementations, the node 74 increases the first amount of data 60*a* transmitted to the wireless device 20 from the base station 72 and decreases the second amount of data 60*b* transmitted to the wireless device 20 from the AP 42 in response to the performance value 50 breaching a performance criterion associated with the wireless device 20. In some implementations, the performance criterion defines a threshold data transfer rate over the communication channel 44. In some implementations, the performance value 50 breaches the performance criterion when the performance of the communication channel 44 degrades or deteriorates. In some implementations, the node 74 decreases the first amount of data 60*a* transmitted to the wireless device 20 from the base station 72 and increases the second amount of data 60*b* transmitted to the wireless device 20 from the AP 42 in response to the performance value 50 satisfying the performance criterion. In some implementations, the performance value 50 satisfies the performance criterion when the performance of the communication channel 44 improves or does not degrade/deteriorate. By adjusting the first and second amounts of data 60*a* and 60*b* based on the performance value 50, the node 74 improves the likelihood of satisfying the performance criterion associated with the wireless device 20. In some implementations, the node 74 receives the performance value 50 from the wireless device 20, the AP 42 and/or the WLAN gateway 46. In some implementations, the node 74 receives the performance value 50 periodically. In some implementations, the node 74 requests the performance value 50 from the wireless device 20, the AP 42 and/or the WLAN gateway 46.

In various implementations, the performance value 50 characterizes a performance of the communication channel 44. In various implementations, the performance value 50 includes a block acknowledgement 52. In some implementations, a block acknowledgement 52 indicates whether data frames (e.g., predefined units of data) are being successfully transmitted over the communication channel 44 between the wireless device 20 and the AP 42. In some implementations, a block acknowledgement 52 includes a series of acknowledgements that correspond to respective frames. In such implementations, each acknowledgement indicates whether the corresponding frame was successfully transmitted over the communication channel 44 or not. In some implementations, the block acknowledgement 52 includes a downlink acknowledgement that indicates whether frames are successfully transmitted from the AP 42 to the wireless device 20. In various implementations, the downlink acknowledgement is transmitted from the wireless device 20 to the AP 42. In some implementations, the wireless device 20 also transmits the downlink acknowledgement to the node 74. In some implementations, the AP 42 and/or the WLAN gateway 46 forward the downlink acknowledgement to the node 74. It some implementations, the block acknowledgement 52 includes an uplink acknowledgement that indicates whether frames are successfully transmitted from the wireless device 20 to the AP 42. In various implementations, the uplink acknowledgement is transmitted from the AP 42 to the wireless device 20. In some implementations, the AP 42 also transmits the uplink acknowledgement to the node 74. In some implementations, the wireless device 20 and/or the WLAN gateway 46 forward the uplink acknowledgement to the node 74. More generally, in various implementations, the node 74 receives the block acknowledgement 52 from the wireless device 20, the AP 42 and/or the WLAN gateway 46.

In various implementations, the performance value 50 includes an error rate 54 associated with the communication channel 44. In some implementations, the error rate 54 indicates a number/percentage of packets that are dropped/lost/corrupted/damaged over the communication channel 44. In various implementations, the performance value 50 includes a throughput 56. In some implementations, the throughput 56 indicates an amount of data that is transmitted over the communication channel 44 over a given amount of time. In various implementations, the performance value 50 includes a quality of service value 58. In some implementations, the quality of service value 58 indicates a quality of the communication channel 44. In some implementations, the quality of service value 58 is a numeric value that is assigned by a user of the wireless device 20.

In various implementations, the wireless device 20 supports multiple RATs. In the example of FIG. 1, the wireless device 20 supports the first RAT utilized by the WLAN 40 and the second RAT utilized by the cellular network 70. As such, in the example of FIG. 1, the wireless device 20 is capable of receiving data from the AP 42 and/or the base station 72. In some implementations, the wireless device 20 subscribes to a cellular service plan provided by the cellular network 70. In some implementations, the node 74 instructs the AP 42 to transmit data to the wireless device 20 as long as the performance value 50 satisfies the performance criterion associated with the wireless device 20 (e.g., as long as a data transfer rate over the communication channel 44 is greater than a threshold data transfer rate). In some implementations, the node 74 instructs the base station 72 to transmit data to the wireless device 20 in response to the performance value 50 breaching the performance criterion associated with the wireless device 20 (e.g., in response to the data transfer rate over the communication channel 44 being less than the threshold data transfer rate). As such, in various implementations, the node 74 adjusts the first amount of data 60*a* transmitted to the wireless device 20 from the base station 72 and the second amount of data 60*b* transmitted to the wireless device 20 from the AP 42 in order to satisfy the performance criterion associated with the wireless device 20.

Figure 2:
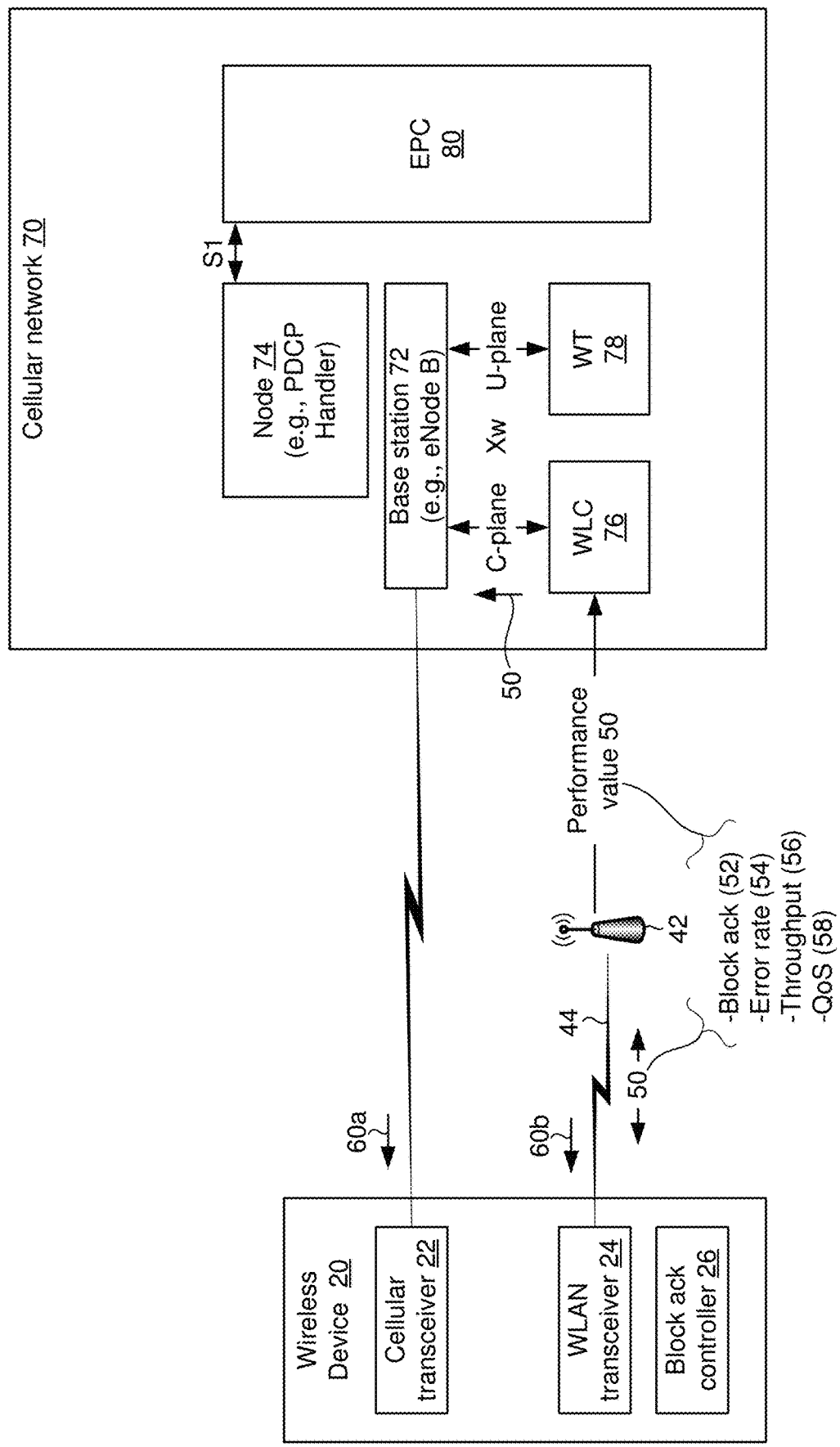
FIG. 2 is a block diagram of a wireless device and a cellular network in accordance with some implementations.

FIG. 2 is a block diagram of the wireless device 20 and the cellular network 70 in accordance with some implementations. In the example of FIG. 2, the wireless device 20 includes a cellular transceiver 22, a WLAN transceiver 24 and a block acknowledgement controller 26. In various implementations, the cellular transceiver 22 allows the wireless device 20 to communicate with the base station 72 of the cellular network 70. In various implementations, the cellular transceiver 22 operates according to 3GPP standards. For example, in some implementations, the cellular transceiver 22 allows the wireless device 20 to communicate with a 5G cellular network. In various implementations, the WLAN transceiver 24 allows the wireless device to communicate with the AP 42. In some implementations, the WLAN transceiver 24 operates according to IEEE 802.11 standards. For example, in some implementations, the WLAN transceiver operates at the 50 Hz frequency band and/or the 2.4 GHz frequency band.

In various implementations, the block acknowledgement controller 26 synthesizes and/or manages block acknowledgements 52. For example, in some implementations, the block acknowledgement controller 26 synthesizes a downlink acknowledgement that indicates whether the wireless device 20 is successfully receiving frames from the AP 42. In some implementations, the block acknowledgement controller 26 transmits the downlink acknowledgement to the AP 42. In some implementations, the block acknowledgement controller 26 also transmits the downlink acknowledgement to the cellular network 70. In some implementations, the wireless device 20 (e.g., the block acknowledgement controller 26) receives an uplink acknowledgement from the AP 42 indicating whether the AP 42 is successfully receiving frames that are transmitted by the wireless device 20. In some implementations, the wireless device 20 (e.g., the block acknowledgement controller 26) forwards the uplink acknowledgement to the cellular network 70.

In various implementations, the wireless device 20 and/or the AP 42 determine the performance value 50, and transmit the performance value 50 to the cellular network 70. For example, in some implementations, the wireless device 20 and/or the AP 42 transmit the block acknowledgements 52 to the cellular network 70. In some implementations, the wireless device 20 and/or the AP 42 determine the error rate 54 associated with the communication channel 44, and transmit the error rate 54 to the cellular network 70. In some implementations, the wireless device 20 and/or the AP 42 determine the throughput 56 of the communication channel 44, and transmit the throughput 56 to the cellular network 70. In some implementations, the wireless device 20 and/or the AP 42 determine the quality of service value 58 for the communication channel 44, and transmit the quality of service value 58 to the cellular network 70.

In the example of FIG. 2, the cellular network 70 includes the base station 72, the node 74, a wireless LAN controller (WLC) 76, a WLAN Termination node (WT) 78, and an Evolved Packet Core (EPC) 80. As described herein, in some implementations, the base station 72 allows cellular devices (e.g., the wireless device 20) to access the cellular network 70. As described herein, in some implementations, the node 74 includes a cellular network node that performs various cellular-related operations. For example, in some implementations, the node 74 performs operations associated with the Packet Data Convergence Protocol (PDCP). As such, in some implementations, the node 74 provides one or more of the following services: transfer of user plane data, transfer of control plane data, header compression, ciphering, and integrity protection. In such implementations, the node 74 is referred to as a PDCP element and/or a PDCP handler. As described herein, in various implementations, the node 74 adjusts the first amount of data 60*a* transmitted to the wireless device 20 from the base station 72 and the second amount of data 60*b* transmitted to the wireless device 20 from the AP 42 based on the performance value 50. As described herein, in some implementations, the node 74 is outside the cellular network 70. In some implementations, the node 74 is operated by an entity that is different from the cellular network operator that operates the cellular network 70. For example, in some implementations, the node 74 is part of an enterprise network.

In some implementations, the WLC 76 communicates with wireless networks that utilize a different RAT from the cellular network 70. For example, in some implementations, the WLC 76 communicates with the WLAN 40. In some implementations, the WLC 76 transmits control messages/signals to the wireless networks (e.g., the WLAN 40). For example, in some implementations, the WLC 76 transmits a control message/signal to the AP 42 instructing the AP 42 to transmit the second amount of data 60b to the wireless device 20. In some implementations, the WLC 76 receives a value indicating the second amount of data 60b from the node 74. In some implementations, the WLC 76 receives the value indicating the second amount of data 60b via a communication interface between the WLC 76 and the base station 72. In some implementations, the communication interface between the WLC 76 and the base station 72 includes an Xw interface. In some implementations, the communication interface between the WLC 76 includes a control plane of the Xw interface.

In some implementations, the WT 78 is in electronic communication with the base station 72 via a data plane of the Xw interface. In some implementations, the WT 78 receives/transmits data from/to the base station 72 via the data plane of the Xw interface. In some implementations, the WT 78 is a logical node where the Xw interface terminates.

In some implementations, the EPC 80 includes a framework for providing converged voice and data on the cellular network 70. In some implementations, the EPC 80 utilizes circuit switching and/or packet switching to provide the voice and data service on the cellular network 70. In some implementations, the EPC 80 communicates with the node 74 over a communication interface between the node 74 and the EPC 80. In some implementations, the communication interface between the node 74 and the EPC 80 is a SI interface.

Figure 3:
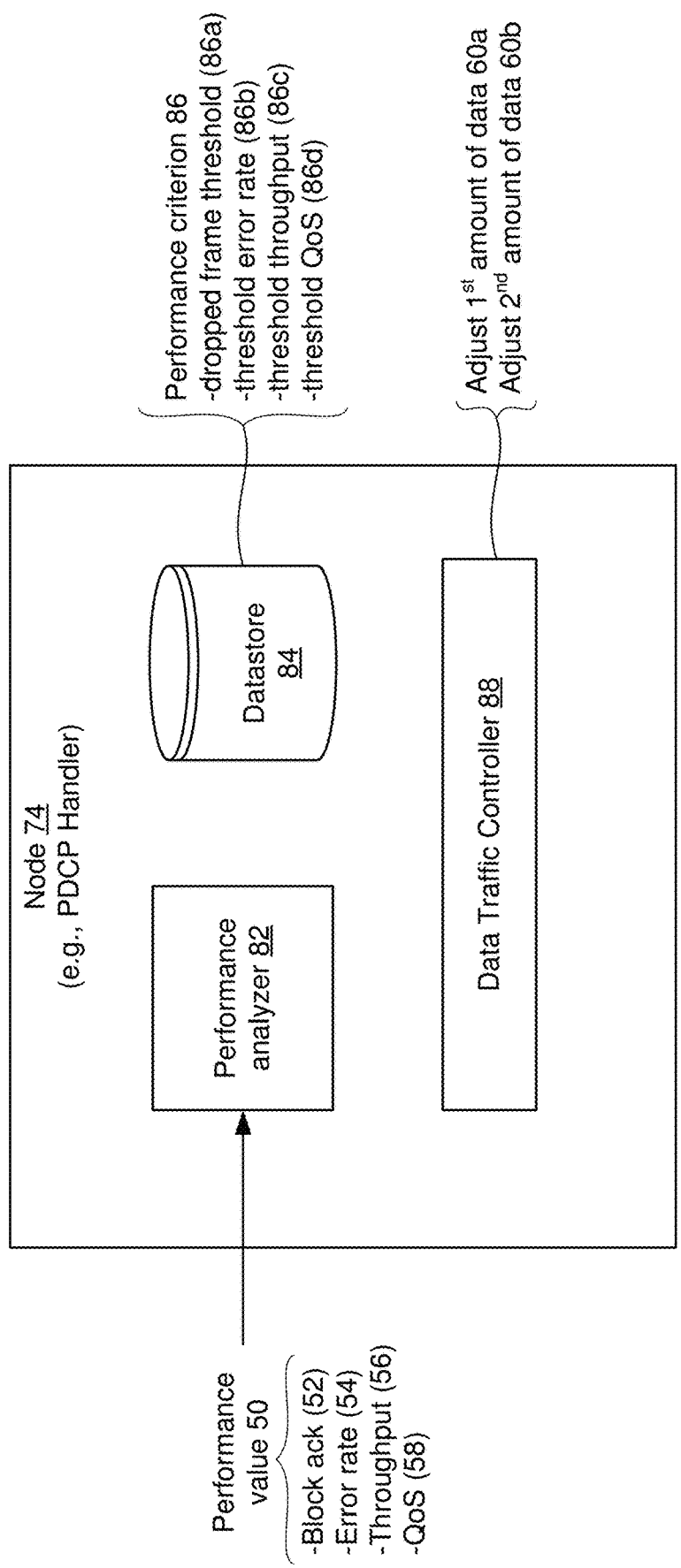
FIG. 3 is a block diagram of a node in accordance with some implementations.

FIG. 3 illustrates a block diagram of the node 74 in accordance with some implementations. In some implementations, the node 74 includes a performance analyzer 82, a datastore 84 and a data traffic controller 88. Briefly, in various implementations, the performance analyzer 82 analyzes the performance value 50, the datastore 84 stores a performance criterion 86, and the data traffic controller 88 adjusts the first amount of data 60a and the second amount of data 60b based on the performance value 50 and the performance criterion 86.

In various implementations, the datastore 84 stores the performance criterion 86. In some implementations, the performance criterion 86 is associated with the wireless device 20. In some implementations, the performance criterion 86 includes a dropped frame threshold 86a. In some implementations, the dropped frame threshold 86a indicates an acceptable number/percentage of dropped frames over the communication channel 44 between the wireless device 20 and the AP 42. For example, the dropped frame threshold 86a indicates an acceptable number/percentage of frames that the wireless device 20 does not successfully receive. In various implementations, a dropped frame refers to a frame that is corrupted, damaged, and/or lost during transmission over the communication channel 44.

In some implementations, the performance criterion 86 includes a threshold error rate 86b associated with the wireless device 20. In some implementations, the threshold error rate 86b indicates an acceptable number/percentage of errors that occur over the communication channel 44 between the wireless device 20 and the AP 42.

In some implementations, the performance criterion 86 includes a threshold throughput 86c associated with the wireless device 20. In some implementations, the threshold throughput 86c indicates an acceptable amount of data that the wireless device 20 receives over a period of time via the communication channel 44 between the wireless device 20 and the AP 42.

In some implementations, the performance criterion 86 includes a threshold QoS 86d associated with the wireless device 20. In some implementations, the threshold QoS 86d indicates an acceptable QoS value/level associated with the wireless device 20.

In some implementations, the performance criterion 86 is determined based on the cellular service plan of the wireless device 20. For example, different cellular service plans correspond with different values for the dropped frame threshold 86a, the threshold error rate 86b, the threshold throughput 86c and/or the threshold QoS 86d. In some implementations, the performance criterion 86 is specified by a user of the wireless device 20. For example, in some implementations, the user of the wireless device 20 specifies the threshold QoS 86d.

In various implementations, the performance analyzer 82 analyzes the performance value 50. In some implementations, the performance analyzer 82 analyzes the performance value 50 by determining whether the performance value 50 breaches the performance criterion 86 for the wireless device 20. For example, the performance analyzer 82 compares the performance value 50 with the performance criterion 86, and determines whether the performance value 50 is greater/less than the performance criterion 86 for the wireless device 20. In some implementations, the performance analyzer 82 receives the performance value 50 from the wireless device 20, the AP 42 and/or the WLAN gateway 46.

In some implementations, the performance analyzer 82 receives the block acknowledgement 52. In such implementations, the performance analyzer 82 analyzes the block acknowledgment 52 to determine a performance of the communication channel 44 between the wireless device 20 and the AP 42. For example, based on a number/percentage of successful acknowledgements in the block acknowledgement 52, the performance analyzer 82 determines a number/percentage of frames that were dropped by the communication channel 44. In some implementations, the performance analyzer 82 determines that the performance value 50 breaches the performance criterion 86 in response to the number/percentage of dropped frames being greater than the dropped frame threshold 86a. In some implementations, the performance analyzer 82 determines that the performance value 50 satisfies the performance criterion 86 in response to the number/percentage of dropped frames being less than or equal to the dropped frame threshold 86a.

In some implementations, the performance analyzer 82 receives the error rate 54 corresponding to the communication channel 44. In such implementations, the performance analyzer 82 analyzes the error rate 54 to determine a performance of the communication channel 44 between the wireless device 20 and the AP 42. For example, the performance analyzer 82 compares the error rate 54 with the threshold error rate 86b. In some implementations, the performance analyzer 82 determines that the performance value 50 breaches the performance criterion 86 in response to the error rate 54 being greater than the threshold error rate 86b. In some implementations, the performance analyzer 82 determines that the performance value 50 satisfies the performance criterion 86 in response to the error rate 54 being less than or equal to the threshold error rate 86*b*.

In some implementations, the performance analyzer 82 receives the throughput 56 of the communication channel 44. In such implementations, the performance analyzer 82 analyzes the throughput 56 to determine a performance of the communication channel 44 between the wireless device 20 and the AP 42. For example, the performance analyzer 82 compares the throughput 56 with the threshold throughput 86*c*. In some implementations, the performance analyzer 82 determines that the performance value 50 breaches the performance criterion 86 in response to the throughput 56 being less than the threshold throughput 86*c*. In some implementations, the performance analyzer 82 determines that the performance value 50 satisfies the performance criterion 86 in response to the throughput 56 being less than or equal to the threshold throughput 86*c*.

In some implementations, the performance analyzer 82 receives the QoS 58 of the communication channel 44. In such implementations, the performance analyzer 82 analyzes the QoS 58 to determine a performance of the communication channel 44 between the wireless device 20 and the AP 42. For example, the performance analyzer 82 compares the QoS 58 with the threshold QoS 86*d*. In some implementations, the performance analyzer 82 determines that the performance value 50 breaches the performance criterion 86 in response to the QoS 58 being less than the threshold QoS 86*d*. In some implementations, the performance analyzer 82 determines that the performance value 50 satisfies the performance criterion 86 in response to the QoS 58 being less than or equal to the threshold QoS 86*d*.

In various implementations, the data traffic controller 88 adjusts the first amount of data 60*a* transmitted to the wireless device 20 from the base station 72 and/or the second amount of data 60*b* transmitted to the wireless device 20 from the AP 42 based on the performance value 50. In some implementations, the data traffic controller 88 receives an indication from the performance analyzer 82 indicating whether or not the performance value 50 breaches the performance criterion 86. In some implementations, the data traffic controller 88 adjusts the first and second amounts of data 60*a* and 60*b* in response to the performance value 50 breaching the performance criterion 86. In some implementations, the data traffic controller 88 increases the first amount of data 60*a* and decreases the second amount of data 60*b* in response to the performance value 50 breaching the performance criterion 86. In some implementations, the data traffic controller 88 increases the first amount of data 60*a* so that the first amount of data 60*a* represents a majority of the data (e.g., all the data) received at the wireless device 20. In some implementations, the data traffic controller 88 decreases the second amount of data 60*b* so that the second amount of data 60*b* represents a minority of the data (e.g., none of the data) received at the wireless device 20.

In some implementations, the data traffic controller 88 adjusts the first and second amounts of data 60*a* and 60*b* so that the combined first and second amounts of data 60*a* and 60*b* satisfy the performance criterion 86. For example, in some implementations, the data traffic controller 88 increases the first amount of data 60*a* and reduces the second amount of data 60 so that the number/percentage of dropped frames detected at the wireless device 20 is above the dropped frame threshold 86*a*. In some implementations, the data traffic controller 88 adjusts the first and second amounts of data 60*a* and 60*b* so that the error rate 54 detected by the wireless device 20 stays below the threshold error rate 86. In some implementations, the data traffic controller 88 adjusts the first and second amounts of data 60*a* and 60*b* so that the throughput 56 experienced by the wireless device 20 stays above the threshold throughput 86*c*. In some implementations, the data traffic controller 88 adjusts the first and second amounts of data 60*a* and 60*b* so that the QoS 58 experienced by the wireless device 20 stays above the threshold QoS 86*d*.

In various implementations, the datastore 84 is stored in a non-transitory memory (e.g., a storage device). In various implementations, the performance analyzer 82 and the data traffic controller 88 are, at least partially, implemented by hardware components (e.g., electric circuits, application specific integrated circuits, a processing device, etc.). In some implementations, the performance analyzer 82 and the data traffic controller 88 are, at least partially, implemented as computer-readable instructions that are executed by a processing device.

Figure 4:
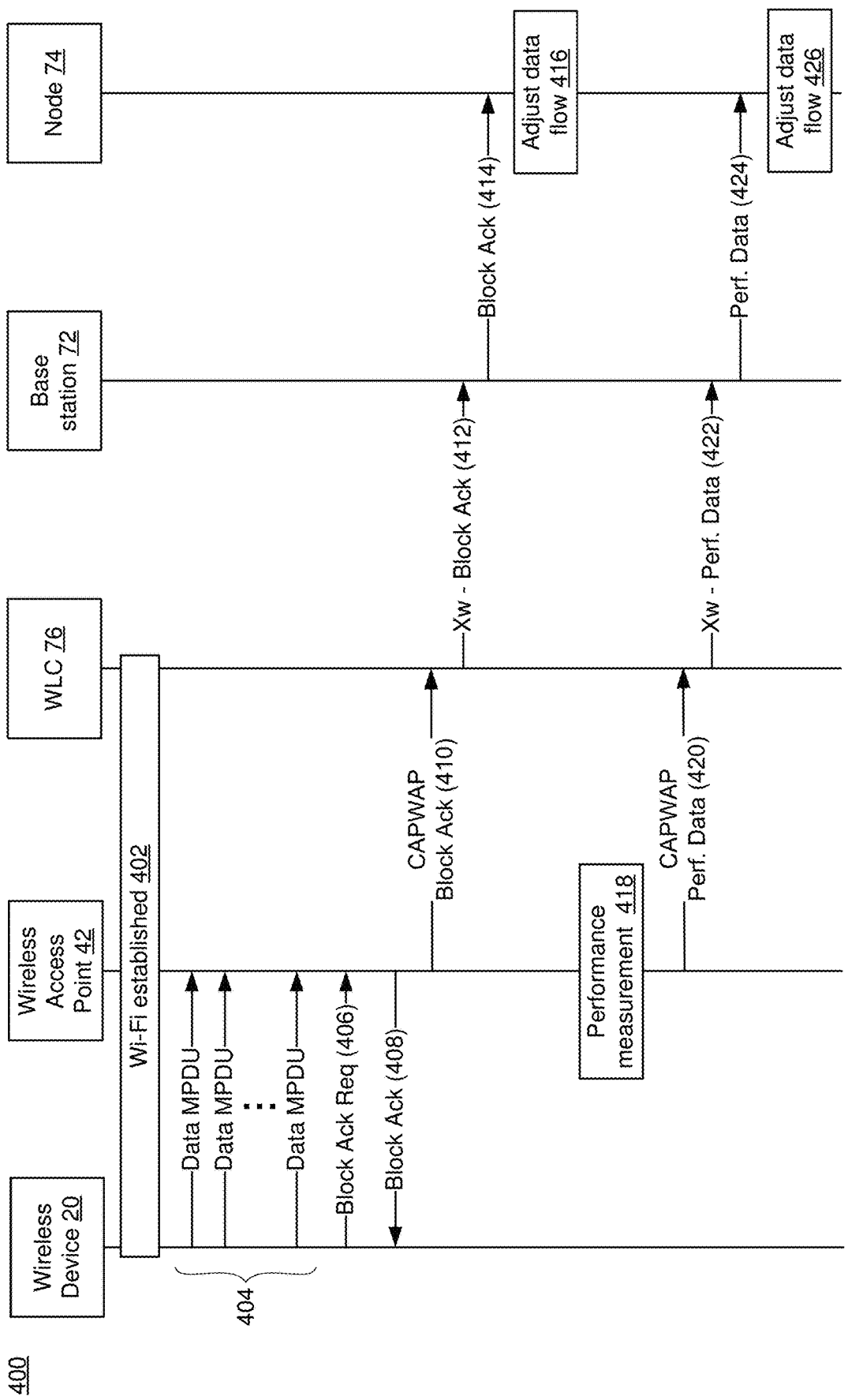
FIG. 4 is a sequence diagram in accordance with some implementations.

FIG. 4 illustrates a sequence diagram 400 in accordance with some implementations. At 402, a communication channel (e.g., the communication channel 44 shown in FIGS. 1 and 2) is established between the wireless device 20 and the AP 42. The cellular network 70 (e.g., the WLC 76) obtains information indicating the establishment of the communication channel between the wireless device 20 and the AP 42. As such, the cellular network 70 (e.g., the WLC 76 and/or the node 74) can instruct the AP 42 to transmit data to the wireless device 20 via the communication channel 44.

At 404, the wireless device 20 and the AP 42 exchange data. For example, the wireless device 20 and the AP 42 exchange media access control protocol data units (MPDUs). In some implementations, a MPDU includes a frame with a predefined format (e.g., a header, a body, etc.). In the example of FIG. 4, the wireless device 20 transmits data (e.g., MPDUs) to the AP 42.

At 406, the wireless device 20 transmits a block acknowledgement request to the AP 42. In some implementations, the block acknowledgement request requests the AP 42 to acknowledge whether the AP 42 has received the data that the wireless device 20 transmitted to the AP 42. For example, in some implementations, the block acknowledgement request requests the AP 42 to acknowledge the receipt of various MPDUs that the wireless device 20 transmitted to the AP 42.

At 408, the AP 42 transmits a block acknowledgement (e.g., the block acknowledgement 52 shown in FIGS. 1-3) to the wireless device 20. As described herein, in some implementations, the block acknowledgement includes a series of acknowledgements that correspond to respective MPDUs. For example, in some implementations, the block acknowledgement indicates which MPDUs the AP 42 received from the wireless device 20. In some implementations, the block acknowledgement indicates which MPDUs were damaged/corrupted/lost/dropped.

At 410, the AP 42 shares the block acknowledgement with the cellular network 70. In the example of FIG. 4, the AP 42 transmits the block acknowledgement to the WLC 76 via a CAPWAP (control and provisioning of wireless access points) protocol. In some implementations, the AP 42 transmits each block acknowledgement to the WLC 76. In some implementations, the AP 42 transmits some of the block acknowledgements (e.g., a portion of the block acknowledgements) to the WLC 76 (e.g., every other block acknowledgement, every third block acknowledgement, etc.).

At 412, the WLC 76 forwards the block acknowledgement to the base station 72 via the Xw interface. In some implementations, the WLC 76 transmits the block acknowledgement to the base station 72 via the control plane of the Xw interface.

At 414, the base station 72 forwards the block acknowledgement to the node 74. In the example of FIG. 4, the node 74 receives the block acknowledgement via the WLC 76 and the base station 72. However, in some implementations, the node 74 receives the block acknowledgement directly from the AP 42 and/or the wireless device 20. For example, as described herein, in some implementations, the node 74 is outside the cellular network 70. In such implementations, the node 74 receives the block acknowledgement via a component of the cellular network 70 (e.g., the WLC 76 and the base station 72), and/or directly from the AP 42 and/or the wireless device 20.

At 416, the node 74 adjusts the first and second amounts of data 60*a* and 60*b* (shown in FIGS. 1-3) based on the block acknowledgement. For example, as described herein, in some implementations, the node 74 increases the first amount of data 60*a* and decreases the second amount of data 60*b* based on a performance of the communication channel 44 indicated by the block acknowledgement.

At 418, the AP 42 obtains a performance measurement. In some implementations, the performance measurement indicates a performance of the communication channel 44 between the wireless device 20 and the AP 42. In some implementations, the performance measurement includes an error rate (e.g., the error rate 54 shown in FIGS. 1-3), a throughput (e.g., the throughput 56 shown in FIGS. 1-3), and/or a QoS (e.g., the QoS 58 shown in FIGS. 1-3).

At 420, the AP 42 transmits the performance measurement to the WLC 76 (e.g., via the CAPWAP protocol). In some implementations, the AP 42 transmits each performance measurement to the WLC 76. In some implementations, the AP 42 transmits some of the performance measurements (e.g., a portion of the performance measurements) to the WLC 76.

At 422, the WLC 76 transmits (e.g., forwards) the performance measurement to the base station 72. In some implementations, the WLC 76 transmits the performance measurement to the base station 72 over the Xw interface (e.g., the control plane of the Xw interface).

At 424, the base station 72 transmits (e.g., forwards) the performance measurement to the node 74. In the example of FIG. 4, the node 74 receives the performance measurement via the WLC 76 and the base station 72. However, in some implementations, the node 74 receives the performance measurement directly from the AP 42 and/or the wireless device 20. For example, as described herein, in some implementations, the node 74 is outside the cellular network 70. In such implementations, the node 74 receives the performance measurement via a component of the cellular network 70 (e.g., the WLC 76 and the base station 72), and/or directly from the AP 42 and/or the wireless device 20.

At 426, the node 74 adjusts the first and second amounts of data 60*a* and 60*b* (shown in FIGS. 1-3) based on the performance measurement. For example, as described herein, in some implementations, the node 74 increases the first amount of data 60*a* and decreases the second amount of data 60*b* based on a performance of the communication channel 44 indicated by the performance measurement.

Figure 5:
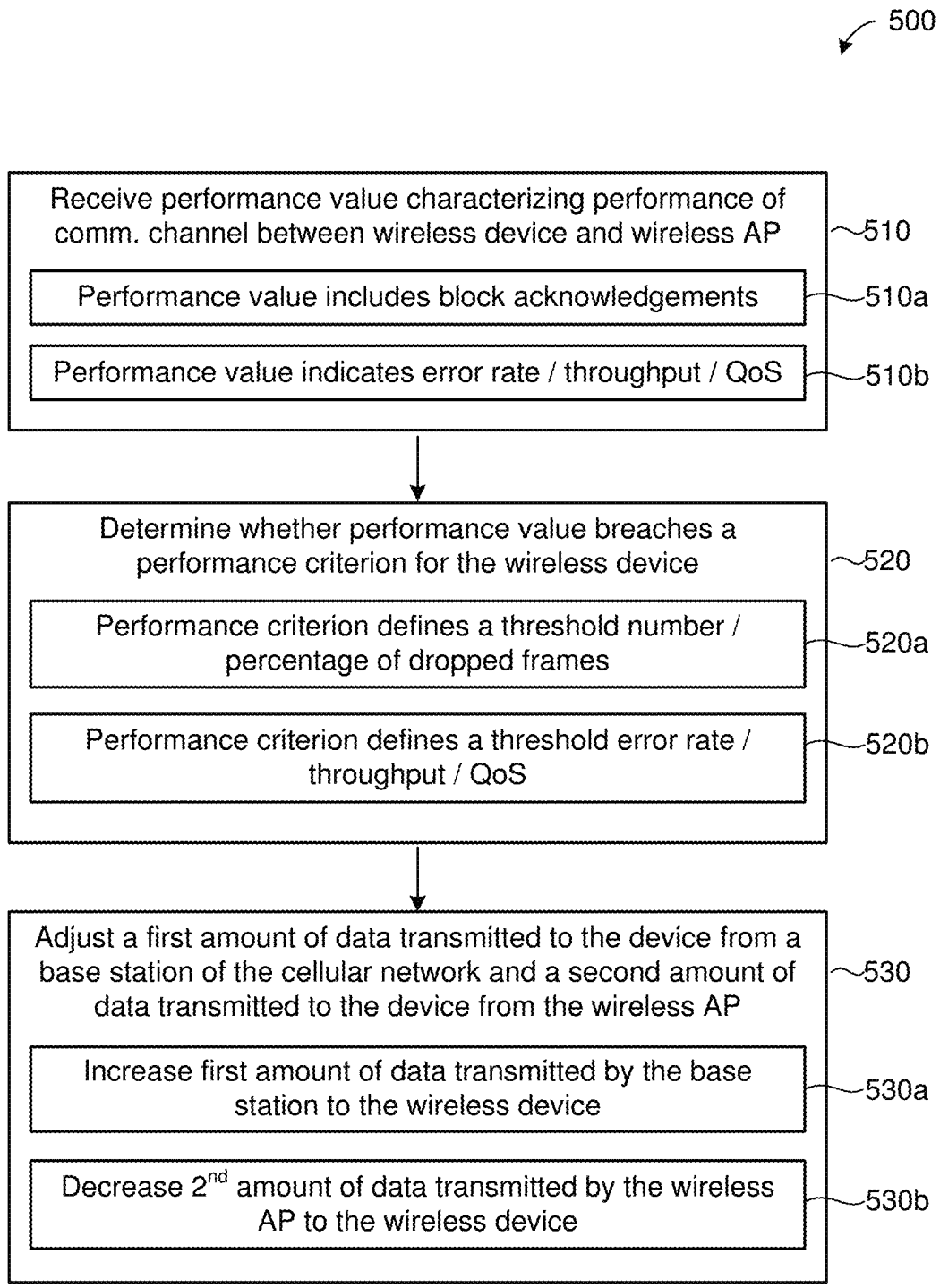
FIG. 5 is a flowchart representation of a method of controlling performance of a wireless device in a heterogeneous network in accordance with some implementations.

FIG. 5 is a flowchart representation of a method 500 of controlling performance of a wireless device in a heterogeneous network in accordance with some implementations. In various implementations, the method 500 is implemented as a set of computer readable instructions that are executed at a node (e.g., the node 74 shown in FIGS. 1-4). Briefly, the method 500 includes receiving a performance value characterizing a performance of a communication channel between a wireless device and a wireless AP, determining whether the performance value breaches a performance criterion for the wireless device, and adjusting a first amount of data transmitted to the wireless device from a base station of a cellular network and a second amount of data transmitted to the wireless device from the wireless AP.

As represented by block 510, in various implementations, the method 500 includes receiving a performance value (e.g., the performance value 50 shown in FIGS. 1-3) that characterizes a performance of a communication channel between a wireless device and an AP (e.g., the communication channel 44 shown in FIGS. 1-3). In some implementations, the wireless device is in electronic communication with the AP and a base station of a cellular network. In some implementations, the AP and the base station utilize different RATs. In some implementations, the method 500 includes receiving the performance value from the wireless device, the AP and/or a component of the cellular network.

As represented by block 510*a*, in some implementations, the performance value includes a block acknowledgement (e.g., the block acknowledgement 52 shown in FIGS. 1-3). In some implementations, the block acknowledgement indicates whether frames are successfully being transmitted over the communication channel between the wireless device and the AP. In some implementations, the block acknowledgement includes a downlink acknowledgement that indicates whether data is successfully being transmitted from the AP to the wireless device. In some implementations, the block acknowledgement includes an uplink acknowledgement that indicates whether data is successfully being transmitted from the wireless device to the AP.

As represented by block 510*b*, in some implementations, the performance value includes an error rate (e.g., the error rate 54 shown in FIGS. 1-3), a throughput (e.g., the throughput 56 shown in FIGS. 1-3), and/or a QoS (e.g., the QoS 58 shown in FIGS. 1-3). In some implementations, the error rate indicates a number/percentage of corrupt/damaged/lost/dropped packets over the communication channel between the wireless device and the AP. In some implementations, the throughput indicates an amount of data (e.g., frames) that are transmitted over the communication channel between the wireless device and the AP over a given amount of time. In some implementations, the QoS indicates a quality of the communication channel between the wireless device and the AP.

As represented by block 520, in various implementations, the method 500 includes determining whether the performance value breaches a performance criterion (e.g., the performance criterion 86 shown in FIG. 3) for the wireless device. In some implementations, the method 500 includes comparing the performance value with the performance criterion. For example, in some implementations, the method 500 includes determining whether the performance value is greater/less than the performance criterion. In some implementations, the performance value indicates an actual performance (e.g., a current performance) of the communication channel between the wireless device and the AP. In some implementations, the performance criterion indicates a target performance (e.g., an expected/desired performance) of the communication channel between the wireless device and the AP. In some implementations, the method 54) includes determining whether the actual performance of the communication channel matches and/or exceeds the target performance of the communication channel.

As represented by block 520a, in some implementations, the performance criterion defines a threshold number/percentage of dropped frames (e.g., the dropped frame threshold 86a shown in FIG. 3). In some implementations, the method 500 includes determining whether a number/percentage of dropped frames indicated by the block acknowledgement is greater/less than the threshold number/percentage of dropped frames. In some implementations, the method 500 includes determining that the performance value breaches the performance criterion in response to determining that the number/percentage of dropped frames indicated by the block acknowledgement is greater than the threshold number/percentage of dropped frames. In some implementations, a dropped frame refers to a frame that is not successfully transmitted over the communication channel between the wireless device and the AP. For example, in some implementations, a dropped frame refer to a frame that is corrupted, damaged or gets lost.

As represented by block 520b, in some implementations, the performance criterion defines a threshold error rate (e.g., the threshold error rate 86b shown in FIG. 3). In some implementations, the method 500 includes determining whether an error rate associated with the communication channel between the wireless device and the AP is greater/less than the threshold error rate. In some implementations, the method 50t) includes determining that the performance value breaches the performance criterion in response to the error rate being greater than the threshold error rate.

As represented by block 520b, in some implementations, the performance criterion defines a threshold throughput (e.g., the threshold throughput 86c shown in FIG. 3. In some implementations, the method 500 includes determining whether a throughput associated with the communication channel between the wireless device and the AP is greater/less than the threshold throughput. In some implementations, the method 500 includes determining that the performance value breaches the performance criterion in response to the throughput being less than the threshold throughput.

As represented by block 520b, in some implementations, the performance criterion defines a threshold QoS (e.g., the threshold QoS 86d shown in FIG. 3). In some implementations, the method 500 includes determining whether a QoS associated with the communication channel between the wireless device and the AP is greater/less than the threshold QoS. In some implementations, the method 5X) includes determining that the performance value breaches the performance criterion in response to the QoS being less than the threshold QoS.

As represented by block 530, in various implementations, the method 500 includes adjusting a first amount of data transmitted to the wireless device from a base station of the cellular network (e.g., the first amount of data 60a shown in FIGS. 1-3) and a second amount of data transmitted to the wireless device from the wireless AP (e.g., the second amount of data 60b shown in FIGS. 1-3). As represented by block 530a, in some implementations, the method 500 includes increasing the first amount of data transmitted by the base station to the wireless device (e.g., increasing the first amount of data 60a shown in FIGS. 1-3). As represented by block 530b, in some implementations, the method 500 includes decreasing the second amount of data transmitted by the wireless AP to the wireless device (e.g., decreasing the second amount of data 60b shown in FIGS. 1-3).

In some implementations, the method 500 includes adjusting the first and second amounts of data so that the combined first and second amounts of data satisfy the performance criterion for the wireless device. For example, in some implementations, the method 500 includes increasing the first amount of data so that the first amount of data and the second amount of data provide a combined throughput that exceeds the threshold throughput. In some implementations, the method 500 includes increasing the first amount of data and reducing (e.g., throttling) the second amount of data so that the number/percentage of dropped frames is below the dropped frames threshold. In some implementations, the method 500 includes adjusting the first and second amounts of data in small increments until a subsequent performance value satisfies the performance criterion. For example, in some implementations, the method 500 includes increasing the first amount of data and reducing the second amount of data until a subsequent block acknowledgement indicates that the number/percentage of dropped frames is less than the dropped frames threshold.

Figure 6:
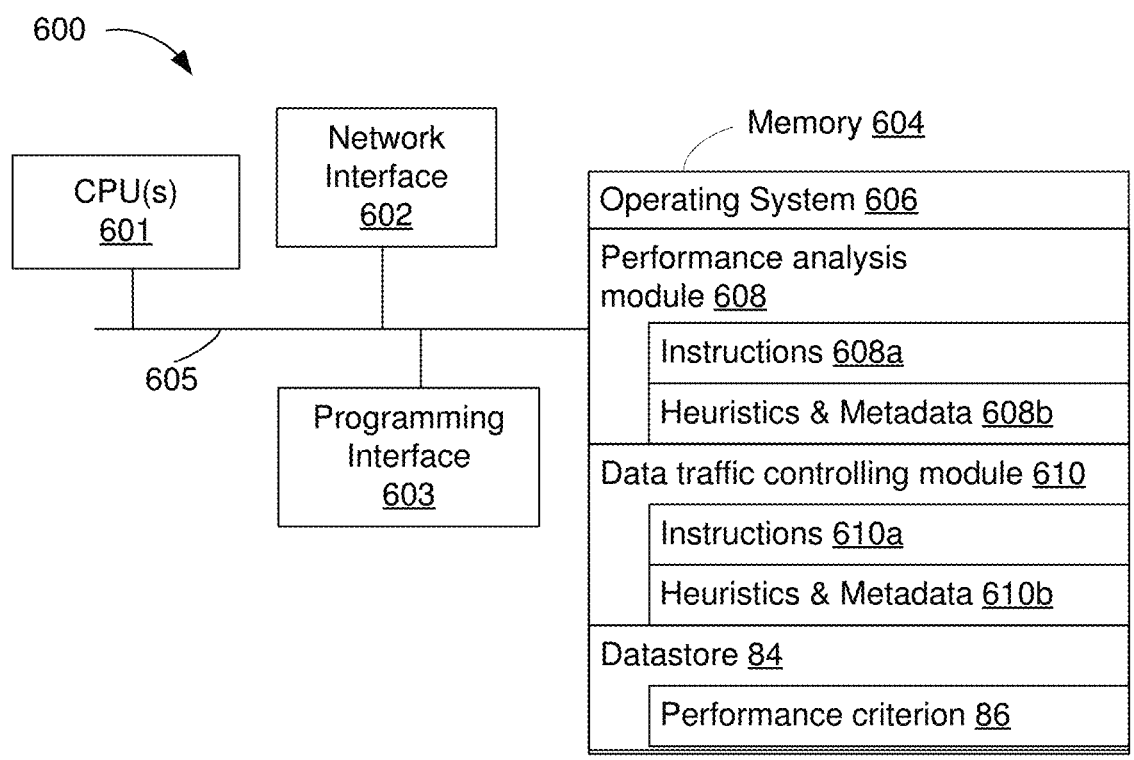
FIG. 6 is a block diagram of a server system enabled with various modules that are provided to control performance of a wireless device in a heterogeneous network in accordance with some implementations.

FIG. 6 is a block diagram of a server system 60) enabled with one or more components of a node (e.g., the node 74 shown in FIGS. 1-4) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604, and one or more communication buses 605 for interconnecting these and various other components.

In some implementations, the network interface 602 is provided to, among other uses, establish and maintain a metadata tunnel between a cloud hosted network management system and at least one private network including one or more compliant devices. In some implementations, the communication buses 605 include circuitry that interconnects and controls communications between system components. The memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 604 optionally includes one or more storage devices remotely located from the CPU(s) 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, a performance analysis module 608, a data traffic controlling module 610 and the datastore 84. In various implementations, the performance analysis module 608 and the data traffic controlling module 610 perform substantially the same operations as the performance analyzer 82 and the data traffic controller 88, respectively, shown in FIG. 3. For example, in various implementations, the performance analysis module 608 receives a performance value characterizing a performance of a communication channel between a wireless device and an AP (e.g., the performance value 50 shown in FIGS. 1-3). In some implementations, the performance analysis module 608 determines whether the performance value breaches the performance criterion 86 stored in the datastore 84. To that end, in various implementations, the performance analysis module 608 includes instructions and/or logic 608a, and heuristics and metadata 608b. In various implementations, the data traffic controlling module 610 adjusts a first amount of data transmitted to the wireless device from a base station of a cellular network (e.g., the first amount of data 60a shown in FIGS. 1-3), and a second amount of data transmitted to the wireless device from the AP (e.g., the second amount of data 60b shown in FIGS. 1-3). To that end, in various implementations, the data traffic controlling module 610 includes instructions and/or logic 610a, and heuristics and metadata 610b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "i" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a node that is in electronic communication with a cellular network, the node including a network interface, a non-transitory memory, and one or more processors coupled with the network interface and the non-transitory memory:
receiving a performance value characterizing a performance of a communication channel between a wireless device and a wireless access point, wherein the wireless access point and the cellular network are associated with different radio access technologies;
determining that the performance value breaches a performance criterion for the wireless device, comprising:
determining that performance over the communication channel between the wireless device and the wireless access point has deteriorated based on a threshold performance criterion; and
increasing a first amount of data transmitted to the wireless device from a base station of the cellular network and decreasing a second amount of data transmitted to the wireless device from the wireless access point based on the determining that the performance value breaches the performance criterion for the wireless device, wherein the performance of the communication channel after the increasing and decreasing satisfies the performance criterion for the wireless device.

2. The method of claim 1, wherein determining whether the performance value breaches the performance criterion includes determining whether a percentage of dropped frames indicated by a block acknowledgement breaches a threshold percentage.

3. The method of claim 1, wherein:
the performance value indicates an error rate associated with the communication channel between the wireless device and the wireless access point; and
determining whether the performance value breaches the performance criterion includes determining whether the error rate associated with the communication channel breaches a threshold error rate.

4. The method of claim 1, wherein:
the performance value indicates a data throughput associated with the communication channel between the wireless device and the wireless access point; and
determining whether the performance value breaches the performance criterion includes determining whether the data throughput associated with the communication channel breaches a threshold throughput.

5. The method of claim 1, wherein:
the performance value indicates a quality of service level associated with the communication channel between the wireless device and the wireless access point; and
determining whether the performance value breaches the performance criterion includes determining whether the quality of service (QoS) level associated with the communication channel breaches a threshold QoS.

6. A node that is in electronic communication with a cellular network, the node comprising:
a processor; and
a non-transitory memory including computer readable instructions, that when executed by the processor, cause the node to:
receive a performance value characterizing a performance of a communication channel between a wireless device and a wireless access point, wherein the wireless access point and the cellular network are associated with different radio access technologies;

determine that the performance value breaches a performance criterion for the wireless device, comprising:
   determining that performance over the communication channel between the wireless device and the wireless access point has deteriorated based on a threshold performance criterion; and
increase a first amount of data transmitted to the wireless device from a base station of the cellular network and decrease a second amount of data transmitted to the wireless device from the wireless access point based on the determining that the performance value breaches the performance criterion for the wireless device, wherein the performance of the communication channel after the increasing and decreasing satisfies the performance criterion for the wireless device.

7. The node of claim 6, wherein a block acknowledgement indicates whether frames are successfully being transmitted from the wireless access point to the wireless device.

8. The node of claim 6, wherein a block acknowledgement indicates whether frames are successfully being transmitted from the wireless device to the wireless access point.

9. The node of claim 6, wherein determining whether the performance value breaches the performance criterion includes determining whether a percentage of dropped frames indicated by a block acknowledgement breaches a threshold percentage.

10. The node of claim 6, wherein:
the performance value indicates an error rate associated with the communication channel between the wireless device and the wireless access point; and
determining whether the performance value breaches the performance criterion includes determining whether the error rate associated with the communication channel breaches a threshold error rate.

11. The node of claim 6, wherein:
the performance value indicates a data throughput associated with the communication channel between the wireless device and the wireless access point; and
determining whether the performance value breaches the performance criterion includes determining whether the data throughput associated with the communication channel breaches a threshold throughput.

12. The node of claim 6, wherein:
the performance value indicates a quality of service level associated with the communication channel between the wireless device and the wireless access point; and
determining whether the performance value breaches the performance criterion includes determining whether the quality of service (QoS) level associated with the communication channel breaches a threshold QoS.

13. The node of claim 6, wherein the node receives the performance value from one or more of the wireless access point and the wireless device.

14. A non-transitory computer readable storage medium storing one or more programs, the one or more programs comprising instructions, which, when executed by a node with a processing device, cause the node to perform or cause performance of:
receiving a performance value characterizing a performance of a communication channel between a wireless device and a wireless access point, wherein the wireless access point and a cellular network are associated with different radio access technologies;
determining that the performance value breaches a performance criterion for the wireless device, comprising:
   determining that performance over the communication channel between the wireless device and the wireless access point has deteriorated based on a threshold performance criterion; and
increasing a first amount of data transmitted to the wireless device from a base station of the cellular network and decreasing a second amount of data transmitted to the wireless device from the wireless access point based on the determining that the performance value breaches the performance criterion for the wireless device, wherein performance of the communication channel after the increasing and decreasing satisfies the performance criterion for the wireless device.

15. The non-transitory computer readable storage medium of claim 14, wherein determining whether the performance value breaches the performance criterion includes determining whether a percentage of dropped frames indicated by a block acknowledgement breaches a threshold percentage.

16. The non-transitory computer readable storage medium of claim 14, wherein:
the performance value indicates an error rate associated with the communication channel between the wireless device and the wireless access point; and
determining whether the performance value breaches the performance criterion includes determining whether the error rate associated with the communication channel breaches a threshold error rate.

17. The non-transitory computer readable storage medium of claim 14, wherein:
the performance value indicates a data throughput associated with the communication channel between the wireless device and the wireless access point; and
determining whether the performance value breaches the performance criterion includes determining whether the data throughput associated with the communication channel breaches a threshold throughput.

* * * * *